US006980183B1

(12) United States Patent
Rosenberg et al.

(10) Patent No.: US 6,980,183 B1
(45) Date of Patent: Dec. 27, 2005

(54) LIQUID CRYSTAL OVER SEMICONDUCTOR DISPLAY WITH ON-CHIP STORAGE

(75) Inventors: Scott A. Rosenberg, Palo Alto, CA (US); Anthony C. Miller, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/365,363

(22) Filed: Jul. 30, 1999

(51) Int. Cl.[7] .................. G06F 13/14
(52) U.S. Cl. .................. 345/87; 345/519
(58) Field of Search .................. 345/204, 205, 345/1, 2, 98, 87, 90, 85, 519, 545, 530, 531, 537, 538, 568

(56) References Cited

U.S. PATENT DOCUMENTS 5,471,225 A 11/1995 Parks .................. 345/98
5,670,993 A * 9/1997 Greene et al. .................. 345/189
5,801,706 A * 9/1998 Fujita et al. .................. 345/502
5,898,420 A * 4/1999 Timm .................. 345/134
5,909,225 A * 6/1999 Schinnerer et al. .................. 345/545
5,945,972 A * 8/1999 Okumura et al. .................. 345/98
5,956,049 A * 9/1999 Cheng .................. 345/501
6,049,316 A * 4/2000 Nolan et al. .................. 345/1
6,067,098 A * 5/2000 Dye .................. 345/503
6,108,229 A * 8/2000 Shau .................. 365/52
6,118,413 A * 9/2000 Bril et al. .................. 345/3
6,128,025 A * 10/2000 Bright et al. .................. 345/504
6,140,983 A * 10/2000 Quanrud .................. 345/55
6,204,864 B1 * 3/2001 Chee .................. 345/531
6,243,072 B1 * 6/2001 McKnight .................. 345/148
6,313,844 B1 * 11/2001 Yamashita .................. 345/531
6,317,135 B1 * 11/2001 Reddy .................. 345/503
6,707,516 B1 * 3/2004 Johnson et al. .................. 349/78

* cited by examiner

*Primary Examiner*—Vijay Shankar
*Assistant Examiner*—Nitin Patel
(74) *Attorney, Agent, or Firm*—Trop, Pruner & Hu, P.C.

(57) ABSTRACT

A display device, such as a projector system, may include a plurality of display panels formed from liquid crystal over semiconductor substrates which incorporate not only the pixel elements but memory as well. The presence of memory in the display allows a host system, such as a computer, to send only new picture information to the display and avoid the transmission of information that does not change. Thus, the display update bandwidth required of the host system may be reduced, allowing the host system to use resources typically required by the display update process for improved performance of other operations. In addition, the elimination of redundant information being transmitted to the display may allow more new information to be transmitted, enabling, for example, a higher resolution display.

8 Claims, 3 Drawing Sheets

LIQUID CRYSTAL OVER SEMICONDUCTOR DISPLAY WITH ON-CHIP STORAGE

BACKGROUND

This invention relates generally to displays for electronic devices such as computers.

Liquid crystal displays (LCD) are used as the displays for a large number of electronic devices including laptop computers, telephones, desktop computers, and televisions. However, the predominant display technology continues to use cathode ray tubes (CRT). Most displays today are designed to interface with the older analog technology standards.

Typical CRTs use a raster update interface. This means that pixels must be repeatedly traced in a linear fashion from left to right across the display and from top to bottom. This scanning occurs at a relatively high rate because the image elements of the CRT glow for only a short period of time. Thus, these image elements or phosphors must be frequently refreshed in order to give the appearance of constant light.

Because of the prevalence and widespread acceptance of CRTs as displays for electronic devices, most displays, including liquid crystal displays, tend to match the CRT interface paradigm. Thus, most displays are not designed to have their images persist for a relatively longer time because the raster interface paradigm guarantees that the image is quickly refreshed.

The display refresh controller which provides the refresh signals for the display may use an interface bus that is also used by a graphics processor and general purpose microprocessor in the host system. In addition, the controller may make use of the system memory that other system level devices utilize. Thus, the continuing demands for display refresh tend to tax the available system resources. This means that some portion of the available system bandwidth must be dedicated to supporting the display refresh operation. This may adversely affect bandwidth and potentially decrease system performance.

The need to periodically refresh the information in the display takes up some of the bandwidth that could be used to increase the resolution of the display. In addition, some of the available bandwidth could be used to provide higher rate images if that bandwidth were not consumed in supplying redundant information to the display.

SUMMARY

A display includes a semiconductor substrate. A liquid crystal over semiconductor pixel array is formed in the substrate. A memory coupled to the array is also formed in the substrate.

DETAILED DESCRIPTION

Figure 1:
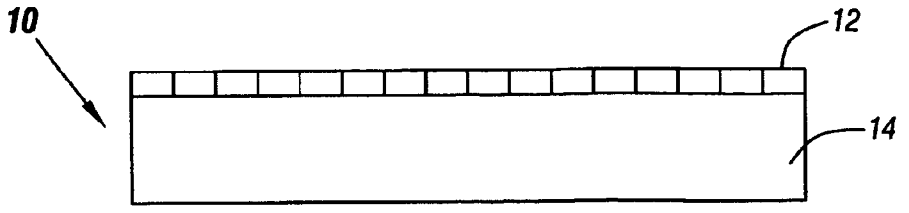
FIG. 1 is a schematic cross-sectional view of one embodiment of the display in accordance with the present invention.

Referring to FIG. 1, an electro-optical device 10, such as a spatial light modulator (SLM), may include a plurality of reflective mirrors 12 defined on a semiconductor substrate 14 in accordance with one embodiment of the present invention. Advantageously, the device 10 is implemented using liquid crystal over semiconductor (LCOS) technology. LCOS technology may form large screen projection displays or smaller displays (using direct view rather than projection technology). With LCOS technology, the liquid crystal display is formed in association with the same substrate that forms complementary metal oxide semiconductor (CMOS) circuit elements. The display may be a reflective liquid crystal display.

The device 10 may include a silicon substrate 14 with a metal layer defining the mirrors 12. The mirrors 12 may be the mirrors of an electro-optic display such as a liquid crystal display. For example, the mirrors 12 may be part of spatial light modulator (SLM) for one of the color planes of a tricolor display. Potentials applied to the mirrors 12 alter the liquid crystal to modulate the incoming light to create images which then can be directly viewed or projected onto a projection screen.

Figure 2:
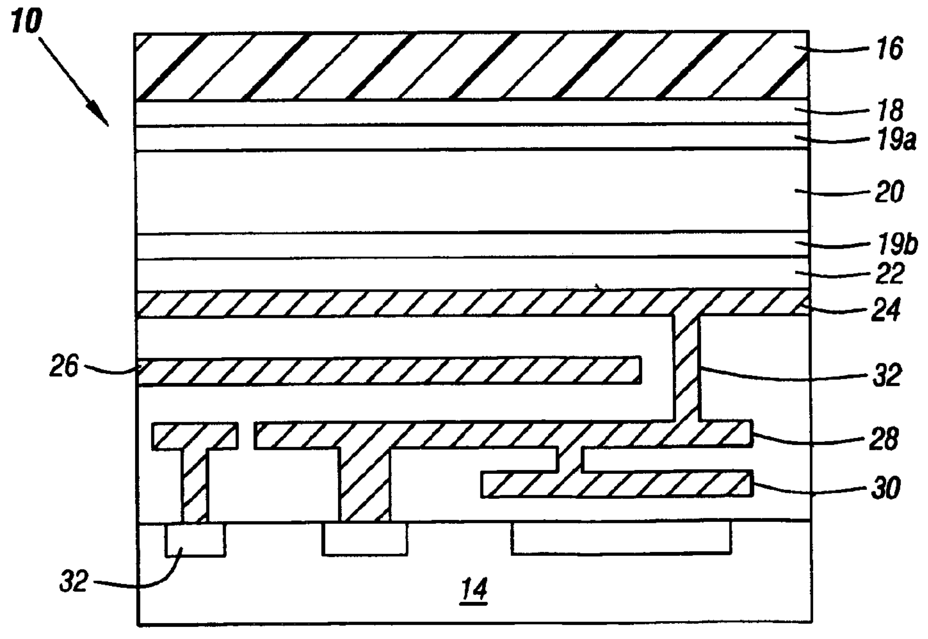
FIG. 2 is a more detailed enlarged, cross-sectional view of a display of the type shown in FIG. 1.

Referring to FIG. 2, each cell or pixel of the display may include a reflective mirror 24 forming one of the mirrors of one of the pixels 12 shown in FIG. 1. In one embodiment of the invention, each cell may be rectangular or square and a slight spacing may occur between each adjacent mirror 24. Thus, a rectangular array of mirrors 24 may form an array of pixel elements in conjunction with liquid crystal material 20 positioned over the mirrors 24.

The LCOS structure includes a silicon substrate 14 having doped regions 32 formed therein. The doped regions 32 may define transistors for logic elements and/or memory cells which operate in conjunction with the display pixels as will be described hereinafter. Four or more metal layers may be provided, including a metal one layer 30 which is spaced by an inter-layer dielectric (ILD) 31 from a metal two layer 28 and a metal three layer 26. A metal four layer may form the pixel mirrors 24. Thus, for example, the metal two layer 28 may provide light blocking and the metal one layer may provide the desired interconnections for forming the semiconductor logic and memory devices. The pixel mirrors 24 may be coupled, by way of vias 32, with the other metal layers.

A dielectric layer 22 may be formed over the mirror 24. A liquid crystal or electro-optic material 20 is sandwiched between a pair of buffered polyimide layers 19*a* and 19*b*. One electrode of the liquid crystal device is formed by the metal layer 24. The other electrode is formed by an indium tin oxide (ITO) layer 18.

A top plate 16 may be formed of transparent material. The ITO layer 1B may be coated on the top plate 26. The polyimide layers 19*a* and 19*b* provide electrical isolation between the capacitor plates which sandwich the electrooptic material 20. However, other insulating materials may be coated on the ITO layer 18 in place of or in addition to the polyimide layers.

Figure 3:
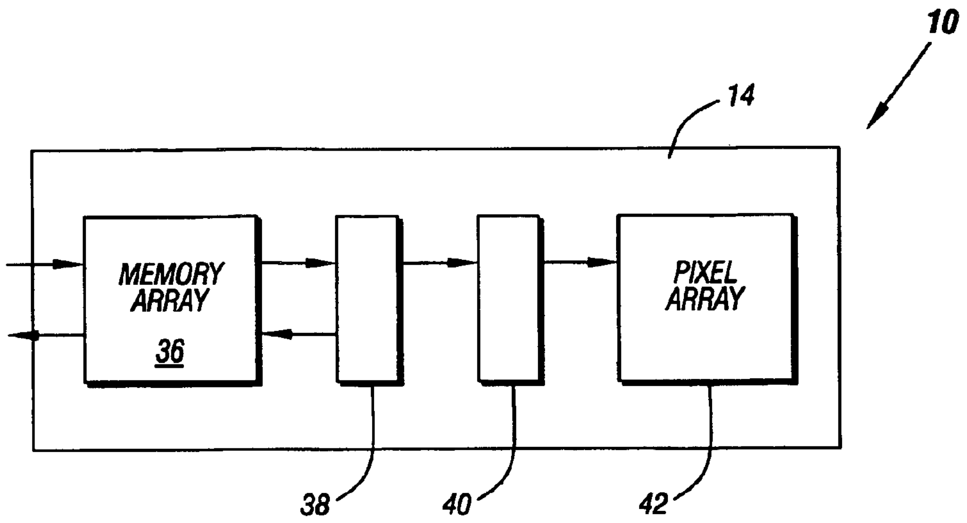
FIG. 3 is a block diagram of a display in accordance with one embodiment of the present invention.

Using the LCOS structure, for example as depicted in FIG. 2, a memory element or array may be incorporated into the same silicon substrate which includes the pixel array. In one embodiment of the present invention, a separate memory array 36 may be included on the same substrate 14 that includes the pixel array 42, as shown in FIG. 3. The memory array may be, for example, dynamic random access memory (DRAM).

The memory array 36 receives and transmits data, as indicated by the arrows on the left side of the array 36 from a display controller in a host processor-based system (not shown in FIG. 3). The array 36 also communicates with the pixel array 42 via a refresh circuit 38 utilized for both DRAM memory refresh and pixel array refresh. A digital to analog converter 40 converts the data from the memory 36 to an analog format for addressing particular pixels in the pixel array 42. Moreover, the refresh circuit 38 may feed back to the memory array 36 so that the refresh circuit 38 not only refreshes the pixels in the pixel array 42 but also refreshes the memory array 36.

Thus, in the process of rewriting the DRAM cells for their own refresh, the same refresh circuitry also updates the pixel cells. Since DRAM and pixel refresh cycles are combined into one cycle, the overall read bandwidth, sourced from the DRAM array, may be reduced. Compared to systems where two separate streams of data are simultaneously read out of the DRAM array, less bandwidth may be used. By using only one stream for both refresh operations, combining the memory and refresh cycles into one cycle, the overall bandwidth required from the DRAM memory is reduced.

In refresh embodiments, flexibility may be achieved in the number of DRAM bits allocated per pixel cell. In some applications, for instance, the creation of multiple low accuracy buffers may be more advantageous than the creation of a single high accuracy buffer. Because the internal scan process produces additional margin, memory bits may be transferred to the pixel array in many ways using embodiments of the present invention.

Figure 4:
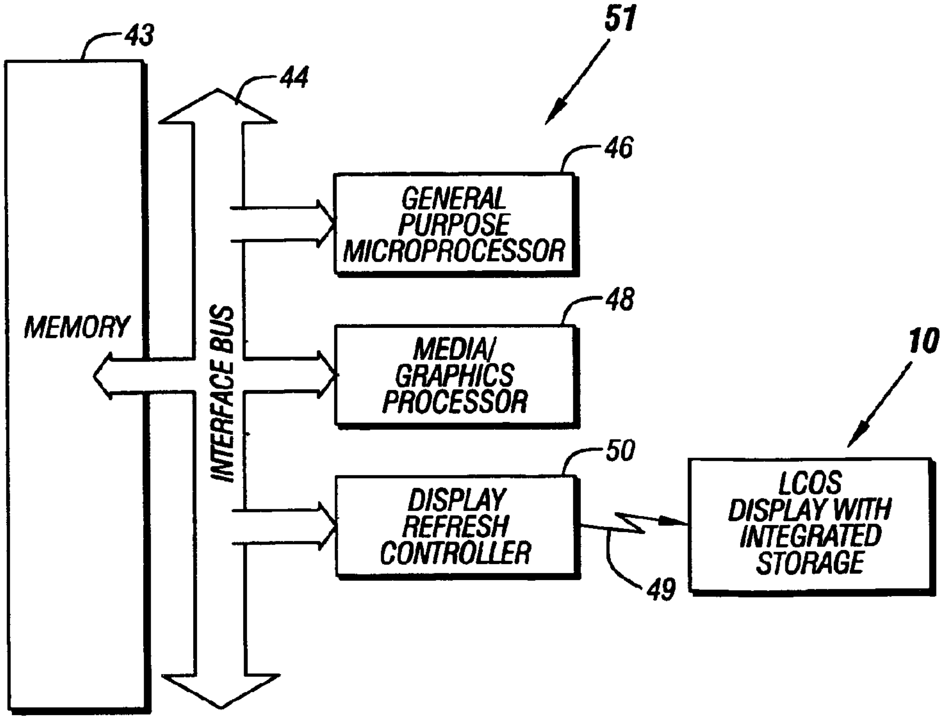
FIG. 4 is a system level block diagram of another embodiment of the present invention.

Referring next of FIG. 4, a processor-based host system 51 for the electro-optical device 10 includes a system memory 43 which is coupled through an interface bus 44 with a general purpose microprocessor 46 in accordance with one embodiment of the invention. The interface bus 44 also may provide processor and memory access to a media or graphics processor 48 and a display refresh controller 50. The display refresh controller is coupled by a bus 49 to the electro-optic device 10 which may be an LCOS display with integrated storage.

In systems that do not modulate the liquid crystal display in an analog fashion, no digital to analog conversion may be used. Values may be read directly from the storage array and used to modulate the pixel elements in the time domain. Such systems are often called pulse-width-modulation (PWM) systems. For example, a 50% brightness value stored in a storage array may entail turning the pixel cell on for half of a frame time and then off for the second half of the frame time.

In other cases, a digital to analog converter may convert data from the memory to an analog gray scale format for use by a pixel array. For example, an entire column or more of pixel values may be read from the storage array into an on-chip register. These values may be converted to analog values in parallel and driven into the pixel array.

Figure 5:
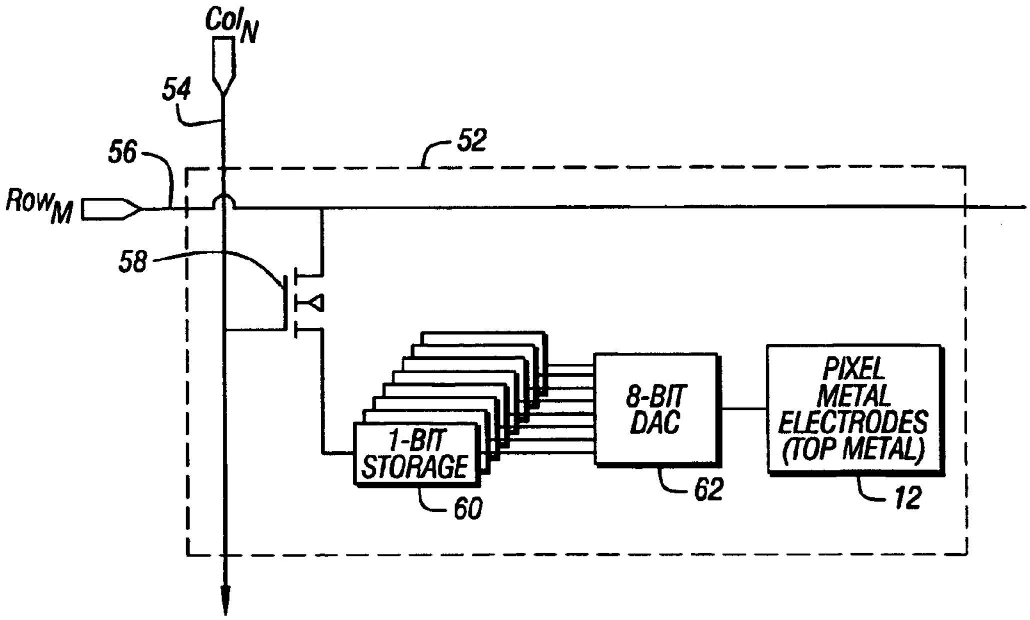
FIG. 5 is a schematic diagram of one cell of the display in accordance with another embodiment of the present invention.
Figure 6:
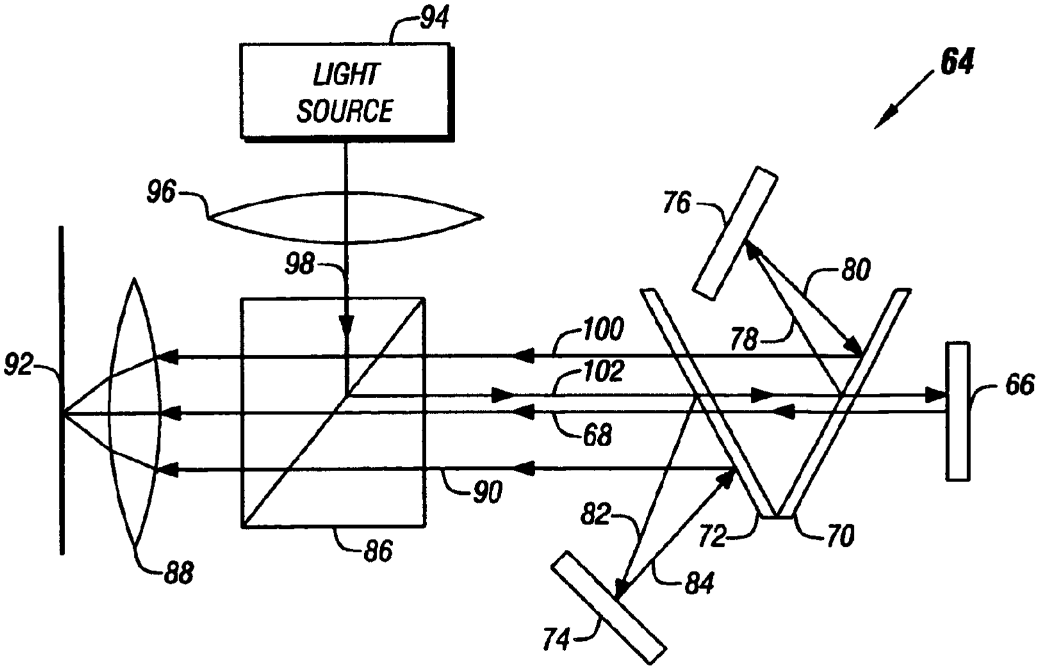
FIG. 6 is a schematic diagram of a display implementing one embodiment of the present invention.

One electro-optical device 10 which may not need a periodic display refresh in some embodiments, is illustrated in FIG. 5. If the periodic display refresh is eliminated, this may also increase the available system wide bandwidth. The illustrated embodiment uses integrated memory 60 for each pixel cell 12. In some embodiments, pixel information may be passed through a digital to analog converter (DAC) 62 to produce gray scale information. The particular manner in which pixels are arranged in the storage array and converted to analog signals may vary by implementation.

Each pixel metal electrode or top metal 12 may be coupled to a separate DAC 62. In one embodiment of the present invention, the DAC may be an eight bit DAC coupled to eight one bit storage elements 60. Each storage element 60 may, for example, be a static random access memory (SRAM) cell. Each one bit storage element 60 may be coupled by a transfer transistor 58 to a different row 56 and a column 54. Thus, the information which is used to refresh the metal mirror 12 may be stored in the memory 60. When it is desired to change the pixel information to change the displayed image, then the information in the memory 60 is refreshed.

Since the display refresh controller only needs to refresh new information to the display, the overall drain on the computer system including the buses and memory may be reduced, potentially yielding better performance out of the other components in the computer system which rely on these limited resources. In addition, the amount of redundant information flowing to the display may be reduced, allowing more new information to be sent to the display. This potentially enables the display of higher resolution or higher rate images.

In one embodiment of the present invention, a projection display 64 includes the spatial light modulators 66, 74 and 76, using liquid crystal over silicon technology with integrated memory. The reflective liquid crystal display projection system 64 typically includes a modulator or display panel (LCD display panels 74, 66 and 76) for each primary color that is projected onto a screen 92. In this manner, for a red-green-blue (RGB) color space, the projection system 64 may include an LCD display panel 74 that is associated with a red color band, an LCD display panel 66 that is associated with the green color band and LCD display panel 76 that is associated with the blue color band. Each of the LCD display panels 66, 74 and 76 modulates light from the light source 94 and the optics 96 that form red, green and blue images, respectively, and add together to form a composite color image on the screen 92. To accomplish this, each LCD display panel receives electrical signals indicating the corresponding modulated beam image to be formed.

More particularly, the projection display 64 may include a beam splitter 86 that directs a substantially collimated white beam 98 of light, provided by the light source 94, to optics that separate the white beam 98 into red 82, blue 78 and green 102 beams. In this manner, the white light beam 98 may be directed to a red dichroic mirror 72 that reflects the red beam towards the LCD display panel 74 that, in turn, modulates the red beam 82. The blue beam passes through the red dichroic mirror to a blue dichroic mirror 70 that reflects the blue beam towards the LCD panel 76 for modulation. The green beam 102 passes through the red and blue dichroic mirrors for modulation by the LCD display panel 66.

For reflective LCD display panels, each LCD display panel 66, 74 and 76 modulates the incident beam and reflects the modulated beams 90, 100 and 68 respectively, so that the modulated beams return on the paths described above to the beam splitter 86. The beam splitter 86, in turn, directs the modulated beams through projection optics such as a lens 88, to form modulated beam images that ideally overlap and combine to form the composite image on the screen 92. Each of the panels 66, 74, and 76 may be implemented using liquid crystal over semiconductor technology as illustrated for example in FIG. 2.

While the present invention has been described with respect to a limited number of embodiments, those skilled in the art will appreciate numerous modifications and variations therefrom. For example, while a projection display is described, the present invention may be used in direct view displays as well. It is intended that the appended claims cover all such modifications and variations as fall within the true spirit and scope of this present invention.

What is claimed is:

1. A display comprising:

a liquid crystal over semiconductor substrate;

a memory array;

a pixel array including a plurality of electrodes to interact with a liquid crystal material over said pixel array; and a refresh circuit coupled to said memory array and said pixel array, said refresh circuit, said memory, and said pixel array formed on the same substrate, said refresh circuit adapted to feed data received from said memory array back to said memory array to refresh said memory array, and said refresh circuit adapted to refresh said pixel array.

2. The display of claim 1 wherein said memory array is formed of dynamic random access memory.

3. A display comprising:

a liquid crystal over semiconductor substrate;

a memory array;

a pixel array including a plurality of electrodes adapted to interact with a liquid crystal material over said pixel array; and a refresh circuit coupled to said memory array and said pixel array, said refresh circuit adapted to refresh said memory array and said pixel array, and said memory array and said pixel array are formed on said substrate with said refresh circuit.

4. The display of claim 3 wherein the pixel array is coupled to the memory array by a digital to analog converter.

5. The display of claim 3 wherein the pixel array forms a reflective liquid crystal spatial light modulator.

6. The display of claim 3 wherein the pixel array is adapted to eliminate a need for a periodic pixel refresh cycle.

7. A display comprising:

a memory array formed of dynamic random access memory;

a pixel array forming a reflective crystal spatial light modulator, said array adapted to eliminate a need for a periodic pixel refresh cycle; and a refresh circuit coupled to said memory array and said pixel array, said refresh circuit adapted to refresh said memory array and said pixel array.

8. The display of claim 7 wherein the pixel array is coupled to the memory array by a digital to analog converter.

* * * * *